United States Patent Office 3,014,817
Patented Dec. 26, 1961

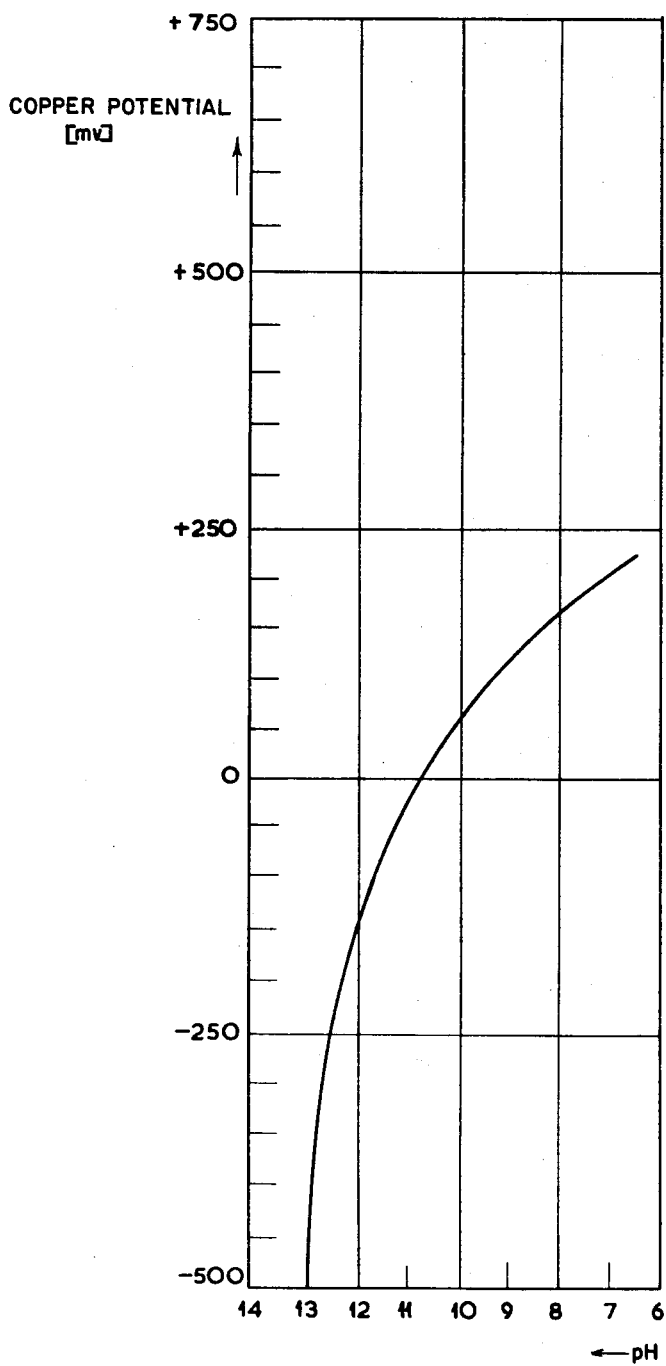

3,014,817
PROCESS FOR COVERING METAL CONSISTING OF CADMIUM OR COPPER WITH AN EXTREMELY THIN PROTECTING CHROMIFEROUS LAYER
Jan Leendert Melse and Petrus Baeyens, Eindhoven, Netherlands, assignors to North American Philips Company, Inc., New York, N.Y., a corporation of Delaware
Filed Feb. 3, 1960, Ser. No. 6,479
Claims priority, application Netherlands Feb. 4, 1959
2 Claims. (Cl. 117—130)

The present invention relates to a mode of treating the metals copper and cadmium and an alloy which mainly consists of one of these metals, such as brass, bronze, tombac, cadmium-zinc alloys and the like.

This treatment yields protection of the surface of the metal to prevent or counteract attack by atmospheric gases or contamination thereof, which attack is often manifested by the production of tarnishing colours such as those caused by hydrogen sulphide-containing air.

In addition, it is achieved by the treatment according to the invention that the surface condition of the metal to be treated is not affected, so that a shining surface does not become dull and does not change in colour, while its solderability is substantially maintained.

Many such treatments have been suggested, in particular such in which the object is covered with a chromiferous layer by wetting the object with an aqueous solution of hexavalent chromium combined with oxygen to which further compounds have been added. Such solutions are prepared by starting from a soluble chromate, bichromate or chromic acid. However, these solutions are acid with concomitant attack of the metal surface during the treatment.

In addition, metal will dissolve and be lost.

According to the invention, these objections are removed by covering copper- or cadmium-containing metal with an extremely thin chromiferous layer by wetting the metal with a solution of hexavalent chromium combined with oxygen, characterized in that the solution has a pH-value between 6.5 and 13 and in that to the solution has also been added a soluble compound, selected from the group consisting of ammonia, triethanolamine and ethylenediamine tetraacetic acid which binds ions of the metal to be protected to form soluble complexes in that way, that the potential difference between the metal to be protected and the ions of said metal is of that magnitude, that at the pH used the protective layer is formed. In realising the invention it has been found that solution containing a soluble chromium compound combined with oxygen can form a protective layer on copper- and cadmium-containing metal, but, in an acid medium, no protection against this acid liquid is obtained, because this protective layer, initially formed, dissolved again and also the metal serving as a base is attacked. It is found that in an alkaline and neutral medium this protective layer is not formed. According to the invention, the fact has now been used that in a non-acid medium yet a certain, but slight attack of the metal to be protected takes place, as a result of which the chromiferous layer forms if the metal ions produced in this attack are partially removed and their concentration is consequently reduced to below a low value which in turn depends on the pH of the solution, on the understanding that the higher this pH is, the lower the concentration of metal ions is to be chosen to form a protective layer. By using the compounds according to the invention in addition to said solution containing hexavalent chromium, the degree in which the metal ions are removed at a certain pH by the complex former, appears to be still dependent on the concentration of the complex former as may be concluded from the dissociation equation:

$$\frac{\text{(complex former) times (metal ions)}}{\text{(metal complex)}} = \text{constant}$$

so that the concentration of the metal ions is decreased by increasing the concentration of the complex former, as a result of which a concentration of metal ions just outside the passivation range is reduced to within this range.

As a measure of the metal ion concentration the metal potential is used. The term metal potential is to be understood to mean the potential between the solution which is used for carrying out the treatment after adding to the solution a quantity of a soluble compound of the metal to be protected corresponding to 0.001 gram ion of the metal in question per litre, and an electrode consisting of this metal.

In the accompanying figure, this line is given for copper as a function of the copper potential and the pH-value of the solution above 6.5. The thickness of the chromiferous layer is of an order between 10 and 100 Angstrom units and this is independent of the duration of the treatment, while this layer also protects the underlying metal against attack by the liquid.

No strong concentrations of the above constituents are required to form this layer.

For the composition of the bath according to the invention are used combinations of quantities of from 15 to 50 gms. of potassium chromate per litre or of equivalent quantities of hexavalent chromium in the form of a soluble bichromate or of chromic acid and of 2–25 g. per litre of the above-mentioned compounds, to which has been added $K_2CO_3$, $Na_2CO_3$, KOH, NaOH, buffering mixtures, such as mixtures of $H_3PO_4$ and these alkalis and the like to obtain the desired pH.

When raising the temperature of the bath, the protective layer forms more rapidly. Therefore elevated operating temperatures are to be preferred. Owing to the thinness of the chromiferous layer, a large surface can be covered with such a protective layer even when using only an extremely small excess of the strictly necessary quantity of the complex former.

*Example*

A number of plates consisting of brass, bronze and copper were treated as follows:

A number of solutions were prepared by dissolving 20 gms. of potassium chromate in one litre of water and the pH-value of the solutions was adjusted to different values by the addition of KOH or $H_2CrO_4$. The copper potential of each solution was measured, after the addition of 0.001 gm. ion of copper per litre in the form of copper sulphate, using a Philips pH-meter (type PR 9900) comprising a copper electrode and a calomel electrode, with which a constant value of the potential was measured within 10 minutes.

In another part of the relative treatment liquid to which no copper sulphate had been added, the metal was immersed for 2 minutes at 90° C. At a pH-value lower than 7 of the treatment solution a copper potential of +478 mv. at pH 1.5 was measured which varied to +211 mv. at a pH of 6.3. As a result the colour of the surface did not change but its appearance became dull. At a higher pH (8.0, 9.4, 10.6, 11.2 and 11.7) nothing has apparently changed, but no protection at all has been obtained as appeared from the following experiment.

After rinsing the plates thus treated, they were treated in a solution containing $K_2S$ to a content of 0.04 N at 20° C. by immersing them for two minutes.

At a pH lower than 6.5 of the first treatment liquid the appearance of the plates had little changed; they only had become dull. At a pH above 6.5, the plates were a strong dark brown.

If this solution contained a quantity of $NH_4$-ions corresponding to 5 ccs. of $NH_4OH$ 14 N, satisfactory protection of the underlying metal was obtained at a pH 7 to pH 9, since the appearance of the copper had not been influenced at all by the second treatment. Both colour and the lustre of the underlying metal had not been affected.

At a pH 9.9 protection was no longer obtained but after the $NH_4$-concentration in this solution had been quintupled protection was again obtained. As a result, the copper potential decreased to $-21$ mv. If the pH was raised to 11.5 any protection failed it was recovered owing to the fact that the $NH_4$-ion concentration had again been doubled, which involved a decrease in copper potential to 0.83 mv. Similar results were obtained if instead of $NH_4$-ions the ions originating from triethanolamine were used.

The pH, at which a solution which contains 25 g./l. hereof reaches the copper ion concentration forming the limit in this range lies at about 9. A somewhat lower pH (8.6) gives a Cu-potential of $+105$ mv. If the pH is increased to 9.3 (Cu-potential $+91$ mv.) a perfect passivation is no longer obtained.

The limiting value at which a concentration of 100 ccs. of 0.1 N ethylenediamine-tetraacetic acid per litre still yields the desired results, lies at a pH of 8.5.

What is claimed is:

1. A method of passivating a metal selected from the group consisting of copper, cadmium and alloys having as major constituents at least one of said metals comprising, contacting said metal with an aqueous solution of an oxygen compound of hexavalent chromium in an amount equivalent to 15 to 50 grams of potassium chromate and 2 to 25 grams per liter of a water-soluble ion complex forming compound selected from the group consisting of ammonia, triethanolamine and ethylenediamine tetraacetic acid, said solution having a pH between 6, 5, and 13.

2. A method of passivating a metal selected from the group consisting of copper and alloys essentially consisting of copper comprising contacting said metal with an aqueous solution of an oxygen compound of hexavalent chromium in an amount equivalent to 15–50 grams per liter and 2–25 grams per liter of a complex copper ion forming compound selected from the group consisting of ammonia, triethanolamine and ethylenediamine tetraacetic acid, the pH of said solution and the copper potential of said solution both being below the curve in the accompanying drawing.

References Cited in the file of this patent
UNITED STATES PATENTS 1,615,585     Humphries _____ Jan. 25, 1927